(12) United States Patent
Short et al.

(10) Patent No.: US 11,460,956 B2
(45) Date of Patent: Oct. 4, 2022

(54) DETERMINING THE LOCATION OF A USER INPUT DEVICE

(71) Applicant: Hewlett-Packard Development Company, L.P., Houston, TX (US)

(72) Inventors: David Bradley Short, San Diego, CA (US); Robert L Mueller, San Diego, CA (US); Jinman Kang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 747 days.

(21) Appl. No.: 15/500,672

(22) PCT Filed: Jul. 31, 2014

(86) PCT No.: PCT/US2014/049303
§ 371 (c)(1),
(2) Date: Jan. 31, 2017

(87) PCT Pub. No.: WO2016/018416
PCT Pub. Date: Feb. 4, 2016

(65) Prior Publication Data
US 2017/0220202 A1     Aug. 3, 2017

(51) Int. Cl.
*G06F 3/042* (2006.01)
*G06F 3/03* (2006.01)
(Continued)

(52) U.S. Cl.
CPC .......... *G06F 3/0425* (2013.01); *G06F 3/0304* (2013.01); *G06F 3/03545* (2013.01);
(Continued)

(58) Field of Classification Search
None
See application file for complete search history.

(56) References Cited

U.S. PATENT DOCUMENTS 7,359,564 B2   4/2008   Keam et al.
7,599,561 B2   10/2009  Wilson et al.
(Continued)

FOREIGN PATENT DOCUMENTS

WO   WO-2013/081671 A1   6/2013

OTHER PUBLICATIONS

A. Kolomenski, "Realization of a Spatial Augmented Reality System a Digital Whiteboard Using a Kinect Sensor and a PC Projector," Thesis, May 2013, pp. 1-80.
(Continued)

*Primary Examiner* — Stephen T. Reed
(74) *Attorney, Agent, or Firm* — Trop Pruner & Hu PC

(57) ABSTRACT

A system includes an image capturing device, a user input device, and a processor coupled to the image capturing device and user input device. The processor includes instructions for capturing a data image with the image capturing device. The data image includes a signal from the user input device. The processor further includes instructions for deactivating the signal from the user input device and, after deactivating the signal from the user input device, capturing an ambient image. The processor further includes instructions for subtracting the ambient image from the data image and determining a position of the user input device in a three-dimensional space using a result of the subtracting.

2 Claims, 2 Drawing Sheets

(51) Int. Cl.
*G06F 3/0354* (2013.01)
*G09G 3/34* (2006.01)
*H04N 5/225* (2006.01)
*H04N 5/33* (2006.01)
*G06F 3/033* (2013.01)

(52) U.S. Cl.
CPC ............ *G06F 3/0421* (2013.01); *G09G 3/34* (2013.01); *H04N 5/2256* (2013.01); *H04N 5/33* (2013.01); *G06F 3/033* (2013.01)

(56) References Cited

U.S. PATENT DOCUMENTS

| | | | |
|---|---|---|---|
| 7,710,391 | B2 | 5/2010 | Bell et al. |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 2004/0140963 | A1* | 7/2004 | Kim ............ G06F 3/0325 345/179 |
| 2005/0078092 | A1 | 4/2005 | Clapper |
| 2008/0018591 | A1 | 1/2008 | Pittel et al. |
| 2011/0205151 | A1 | 8/2011 | Newton et al. |
| 2011/0234542 | A1* | 9/2011 | Marson ............ G06F 3/0418 345/175 |
| 2011/0242054 | A1 | 10/2011 | Tsu |
| 2013/0077236 | A1 | 3/2013 | Becze et al. |
| 2014/0098018 | A1 | 4/2014 | Kim et al. |
| 2014/0139668 | A1 | 5/2014 | Short |
| 2014/0139717 | A1* | 5/2014 | Short ............ H04N 7/142 348/333.1 |
| 2014/0152582 | A1 | 6/2014 | Agarwal et al. |
| 2014/0168069 | A1 | 6/2014 | Chen et al. |
| 2015/0338933 | A1* | 11/2015 | Holz ............ G06F 3/03545 345/179 |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

Soares et al., "LoCoBoard: Low-Cost Interactive Whiteboard Using Computer Vision Algorithms," Research Article, ISRN Machine Vision, 2013, Article ID 252406, pp. 1-13.

The Wii-Mote Project, 2012, pp. 1-4, Para Techies, Available at: <paratechies.weebly.com/wii-mote-project.html>.

* cited by examiner

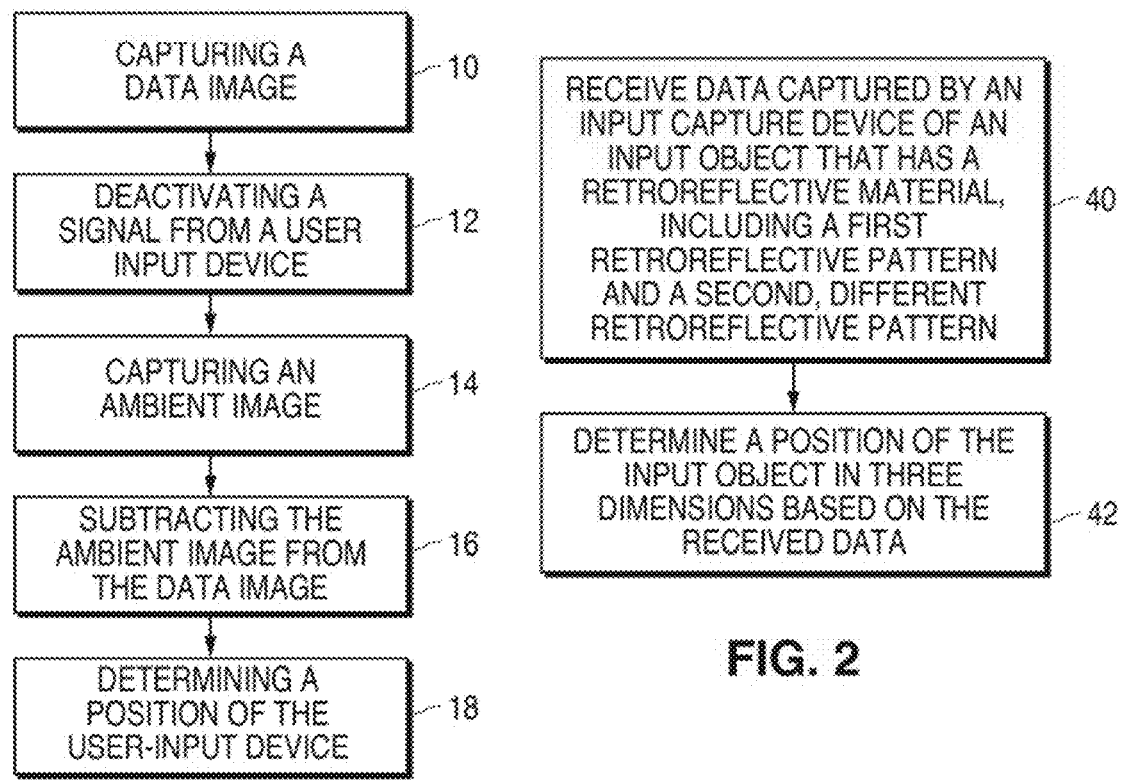
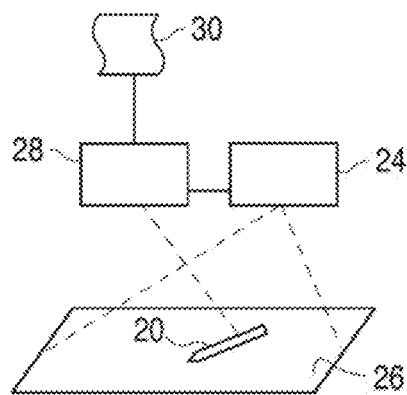
FIG. 1
FIG. 2
FIG. 3
FIG. 4

DETERMINING THE LOCATION OF A USER INPUT DEVICE

BACKGROUND

Computer systems may include peripherals that emit signals that must be detected by the computer system. Often non-visible light such as infrared (IR) or ultraviolet (UV) light is used for such signals. However, because various visible light sources also produce UV and/or IR light, light from such ambient sources can also adversely impact the ability of the computer system to detect the signal emitted by the peripheral. For example, incandescent lights, the sun, and a variety of other common sources generate IR and/or UV light. These unintended signals can provide undesired input to the computer system.

BRIEF DESCRIPTION OF THE DRAWINGS

For a detailed description of various examples, reference will now be made to the accompanying drawings in which:

FIG. 1 is a flow chart illustrating a method according to examples of the invention;

FIG. 2 is a flow chart illustrating a method of determining a position of a user input device;

FIG. 3 is a block diagram of system according to examples of the invention;

FIG. 4 is a block diagram of n image capture device according to some examples;

NOTATION AND NOMENCLATURE

Figure 5:
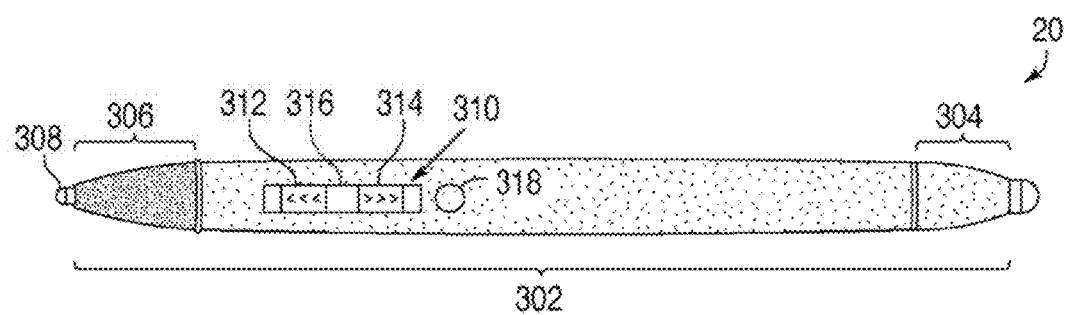
FIG. 5 is a side view of a stylus according to some examples.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein, the phrase "user input device" refers to any suitable device for providing an input, by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Examples of the invention include methods and devices which may detect the signal from a user input device such as an infrared (IR) stylus. Though the discussion below refers to an IR stylus for economy of language, it is to be understood that any user input device emitting any appropriate signal may be substituted for the IR stylus. The IR stylus may be manipulated by a user in a two-dimensional or three-dimensional work space. Examples of the invention may separate the signal emitted by the IR stylus from ambient IR light.

FIG. 1 illustrates a method according to examples of the invention. In block 10, a data image is captured. The data image may be captured by a camera or any other suitable image capture device. For example, suitable cameras include IR cameras and depth cameras, or any other suitable device.

The data image includes a signal from the user input device, and any other information in the captured area. For example, in the case of an IR stylus as the user input device and an IR camera as the image capture device, the data image includes the signal emitted by the tip of the IR stylus, and any other IR radiation in the image captured by the camera. Other IR radiation may include, for example, IR radiation from light sources, and/or IR radiation that is reflected off objects.

In block 12, a signal from the user input device is deactivated. For example, an IR light source internal to the user input device is turned off, shielded, or otherwise prevented from being detected by an image capturing device, and/or an IR light source external to the user input device, which emits light that is reflected by the retroreflective coating(s) on the user input device as described below, is turned off, shielded, or otherwise prevented from being detected by an image capturing device.

In block 14, after deactivating the signal from the user input device, an ambient image is captured. The ambient image is often captured by the same image capture device, though this is not required. Because the signal from the user input device is deactivated, the ambient image includes only ambient light. For example, in the case of an IR stylus and an IR camera, the ambient image includes IR radiation from light sources, and/or IR radiation that is reflected off objects.

In block 16, the ambient image is subtracted from the data image. The ambient radiation is thus removed, leaving only the signal from the user input device. The ambient image is subtracted from the data image to increase the signal to noise ratio of the desired signal, the emission from the user input device.

In block 18, the position of the user input device is determined. The position may be determined using the result of the subtraction of the ambient image from the data image.

FIG. 2 illustrates one example of determining the position of the user input device. The process of FIG. 2 can be performed by a system, which can include an electronic device, an arrangement of electronic devices, a processor, or an arrangement of processors. In some examples, the system that can perform the process of FIG. 2 is the system of FIG. 3 described below.

In block 40, the system receives data captured by an image capture device of an input object (e.g. the stylus) that has a retroreflective material on a surface of the stylus. The retroreflective material on the outer surface of the stylus can include a first retroreflective pattern and a second, different retroreflective pattern, as described below. The different patterns can, have different shapes, different sizes, or can have any other characteristic that can distinguish one retroreflective pattern from another retroreflective pattern. In some examples, the first retroreflective pattern can be provided at an upper portion of the stylus, while the second retroreflective pattern can be provided at a bottom portion of the stylus, such as near or on a tip portion of the stylus. The use of different retroreflective patterns allows for a distinction to be made between the top and bottom portions of the stylus.

In block 42, the system determines a position of the input object in three dimensions based on the received data. Based on the position of the input object, or on a gesture that can be derived based on multiple positions of the input object as determined by the system, one or multiple input events can be generated by the system.

FIG. 3 illustrates a system according to examples of the invention. The system illustrated in FIG. 3 includes a stylus 20, an image capturing device 24, and a processor 28.

The image capturing device 24 may be, for example, one or more still cameras, video cameras, or any other suitable device capable of capturing images of a work space 26. In some examples, the image capturing device includes one or more IR cameras.

The work space 26 may be delineated by visual or actual borders, though this is not required. For example, the work space 26 may be empty space, a pad with no functionality, or a touch-sensitive or other pad that may be used as a user-input device. The work space 26 is often substantially horizontal, for example a table top surface or desk top surface, though this is not required.

The processor 28 includes a central processing unit, volatile memory, nonvolatile memory, and any other suitable components. The processor 28 is often incorporated into a computer. As used herein, the term "computer" refers broadly to any device that a user controls or interacts with using an input device. A computer is often a general purpose computer that can execute a wide variety of applications under the control of a user. Examples of suitable computers include desktop computers, laptop computers, other personal computers, smartphones, tablets, all-in-one computers (i.e., a display that also houses the computer's board), or some combination thereof.

Non-transitory machine readable instructions 30 are coupled to processor 28. Non-transitory machine readable instructions 30 are a set of computer-readable instructions installed on a computer-readable medium such as, for example, a hard drive of the computer, and executed by the processor 28.

The processor 28 is coupled (wirelessly in some examples) to the stylus 20 and the image capturing device 24. The processor can include a wireless interface that is able to communicate wirelessly with a corresponding wireless interface in the stylus 20. The wireless interface can be a radio frequency (RF) interface, an IR interface, and so forth. As examples, the wireless interface can be a Bluetooth interface, a near field communication (NFC) interface, or any other type of wireless interface.

The non-transitory machine readable instructions 30 include instructions for capturing a data image including a signal from a user input device; deactivating the signal from the user input device, then capturing an ambient image. The non-transitory machine readable instructions 30 further include instructions for subtracting the ambient image from the data image; and determining a position of the user input device in a three-dimensional space using a result of the subtracting.

In some examples, the non-transitory machine readable instructions 30 may further include instructions to display the position of the user input device, for example on any suitable display device such as a monitor (not shown in FIG. 3). In some examples, optics for the display device (such as, for example, a projector) are coaxially aligned with optics that detect the stylus 20 (such as, for example, a light source that illuminates stylus 20, and/or the image capturing device 24 that captures images of the stylus 20). The display device optics and the stylus detection optics are aligned such that they have identical or nearly identical chief ray angles. In such a system, the detection location of the stylus tip will always be identical to the displayed (for example, projected) location at any height on the z axis, due to the matched chief ray angles.

The processor can apply image processing to images of the stylus 20 captured by the image capturing device 24. The image processing applied by the processor can detect a position of the stylus 20 in three dimensions. The three dimensions can include the x, y, and z axes, where the x and y axes can lie in a horizontal plane, for example, while the z axis extends in a vertical plane, for example. More generally, the x and y axes lie in a first plane, and the z axis is perpendicular to both the x and y axes. The z axis corresponds to a depth of the stylus 20 with respect to the work space 26.

FIG. 4 illustrates one example of an image capturing device 24. The image capturing device 24 includes an R camera or other suitable camera 50 and a depth sensor 52. The image capturing device 24 is positioned with a fixed optical geometry relative to the work space 26. The fixed optical geometry is used to map the images captured by the camera 50 and depth sensor 52 into a three-dimensional output result. More cameras and/or depth sensors may be used; the invention is not limited to a system including a single camera as illustrated in FIG. 4. The depth sensor 52 can capture depth information of an object, including the stylus 20. The depth sensor 52 may be part of IR camera 50 in some examples or a separate device in some examples.

A position of the stylus 20 in the x, y, and z axes can be determined by the processor 28. Based on determined position(s) of the stylus 20, the processor can produce a respective input event(s). The input event(s) can be used by other logic in the computer, such as machine-readable instructions (e.g. software or firmware), a processor, and so forth.

Note that the processor can determine a position of the stylus 20 in three dimensions even when the stylus 20 hovers over the work space 26. This determination can be made without physical interaction between the stylus 20 and the work space 26, while the stylus 20 hovers over the work space 26. In some examples, FIG. 5 is a side view of a stylus 20 according to some examples. The stylus 20 is generally shaped as a wand in the example of FIG. 5. The stylus 20 has an overall body 302. A retroreflective material can be applied to the outer surface of the body 302 substantially along the whole length of the body 302. "Substantially along a whole length" of the body of the input object can refer to greater than 50% of the whole length of the body of the input object. In other examples, the retroreflective material is not applied substantially to the whole length of the stylus 20, but instead, can be applied to an upper portion 304 and a bottom portion 306 of the stylus 20. Note that the upper portion 304 and bottom portion 306 can have a longer length, or shorter length, than depicted in the example of FIG. 5. The upper portion 304 and lower portion 306 can have respective retroreflective patterns that are different from each other.

A retroreflective material reflects incident light along a path that is parallel to the path of the incident light. In other examples, the retroreflective material can be a substantially retroreflective material, where light is reflected back along a path that is approximately parallel to the path of the incident light. A path of the reflected light is approximately parallel to the path of the incident light if the path of reflected light is within 20° of being parallel with the path of the incident light.

Incident light can be produced by a light source assembly, not shown in FIG. 3, which can include one or multiple light sources. The light produced by the light source assembly can be in a specified range of wavelengths. For example, the range of wavelengths of light produced by the light source assembly 108 can be 825 millimeters to 875 millimeters.

The bottom part of the stylus 20 may be provided with a moveable plunger 308 (which is an example of the tip portion referred to above). The moveable plunger 308 can be a spring-loaded plunger that is moveable longitudinally along the length of the stylus 20 when the plunger 308 makes contact with a surface such as a surface of work space 26. Movement of the plunger 308 can be detected by a plunger sensor disposed within the stylus, which can be an electrical switch sensor, an optical sensor or any other type of sensor.

In the example according to FIG. 5, a user-activatable button 310 can be provided, which can be depressed by a user. Depressing a portion 312 of the button 310 causes a first actuation of the button 310. Pressing a second portion 314 of the button 310 causes a second actuation of the button 310. Pressing a middle portion 316 of the button 310 causes a third actuation of the button 310. The different actuations can correspond to three different button inputs. In other examples, other types of user-activatable elements can be provided.

The stylus 20 also includes a light emitting diode (LED) indicator 318. The stylus 20 may include a battery to provide power to the various components in the stylus.

Figure 6:
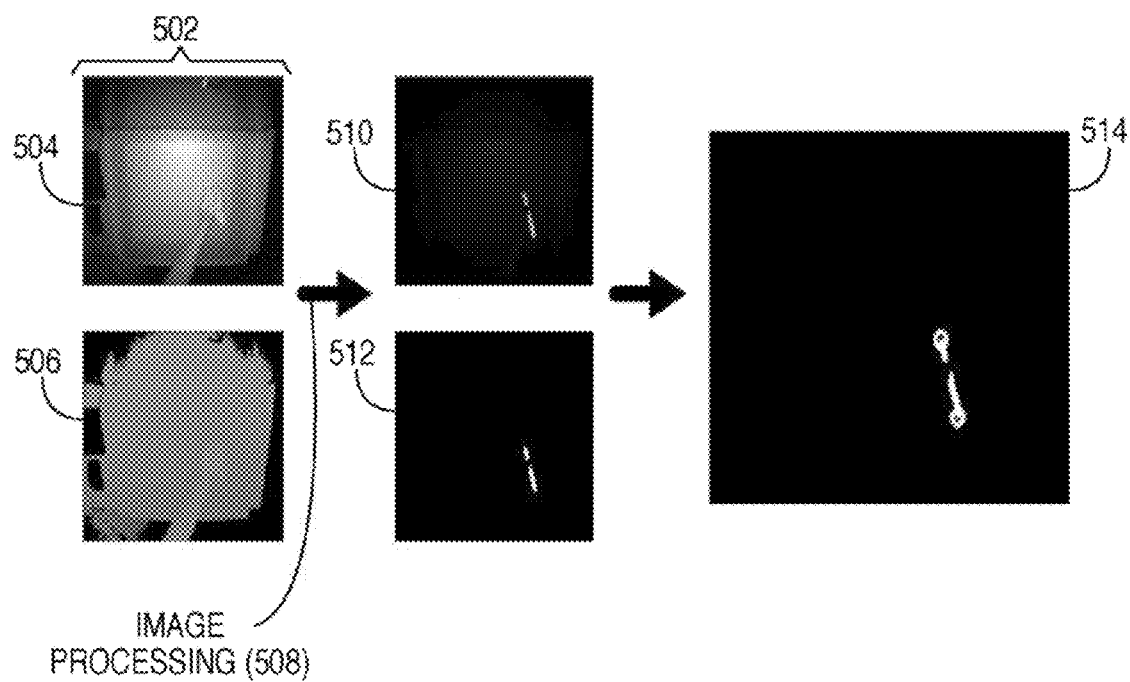
FIG. 6 is a schematic diagram of image processing of an image of a stylus as captured by an image capture device, according to some examples.

FIG. 6 is a schematic diagram of image processing that can be performed by the processor 28 according to some examples. The processor receives data 502 provided by the image capture device 24, which can include an IR camera, for example. The IR camera provides a raw IR image 504, which depicts the stylus 20 as held by a user above the work space 26. The input data 502 further includes depth information 506, as captured by the depth sensor of the IR camera. The depth information 506 provides indications of the depth of the elements captured in the raw image 504.

The processor applies image processing 508 to the input data 502 to identify a position of the stylus 20. The image processing 508 produces a processed image 510 that highlights the stylus 20 while removing the remainder of elements in the raw image 504, including the user's hand and the work space. The depth information 506 is also converted by the image processing 508 to a depth image 512 that highlights the stylus 20.

The image processing 508 to highlight the stylus 20 is made more accurate due to use of the retroreflective material on the outer surface of the stylus 20.

Combining the images 510 and 512 produces an output image 514 of the stylus 20 that includes 3D information, which can be used to determine the 3D position of the stylus 20.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   an image capturing device, wherein the image capturing device comprises an infrared camera and a depth sensor;
   a user input device comprising a retroreflective material comprising a first retroreflective pattern and a second retroreflective pattern, wherein the first retroreflective pattern is different from the second retroreflective pattern; and
   a processor coupled to the image capturing device and user input device, the processor comprising instructions for:
      capturing a data image with the image capturing device, the data image comprising a signal from the user input device;
      deactivating the signal from the user input device;
      after deactivating the signal from the user input device, capturing an ambient image;
      subtracting the ambient image from the data image; and
      determining a position of the user input device in a three-dimensional space using a product of said subtracting, wherein the user input device is elongated along an axis between a first end of the user input device and a second end of the user input device, and determining the position of the user input device comprises using the first and second retroreflective patterns to distinguish the first end of the user input device from the second end different parts of the user input device; and
   a projector for displaying the position of the user input device, wherein optics associated with the projector are coaxially aligned with optics associated with the image capturing device.

2. The system of claim 1, wherein the optics associated with the projector and the optics associated with the image capturing device have nearly identical chief ray angles.

* * * * *